United States Patent Office 3,228,900
Patented Jan. 11, 1966

3,228,900
HIGHWAY MARKING COMPOSITIONS COMPRISING CROSS-LINKED COPOLYMERS OF FATTY OIL-CARBOXYLIC ACID ADDUCTS
Norman Spellberg, Orinda, and John W. Lorimer, Berkeley, Calif., assignors to De Soto Chemical Coatings, Inc., Chicago, Ill., a corporation of Delaware
No Drawing. Filed Sept. 20, 1962, Ser. No. 225,154
21 Claims. (Cl. 260—23)

The present invention relates to thermoplastic resins especially adapted for hot melt application of highway marking stripes, particularly the production of thick stripes containing glass particles (usually beads) for reflex reflectance effect. The invention includes new thermoplastic resins and their production as well as the glass bead-containing highway marking compositions which are provided.

The provision of a satisfactory highway marking composition adapted for hot melt application is a difficult matter since numerous qualities are of importance, some of these being inconsistent with one another and, therefore, difficult to obtain in a single material. Most notable among the desired characteristics are:

(1) No injurious fumes emitted from hot melt;
(2) Stable at operating temperature;
(3) Stable temperature-viscosity characteristics on reheating;
(4) Rapid solidification;
(5) Impact resistance;
(6) Good reflectance;
(7) Good bond strength;
(8) Good yellowing resistance (for white only);
(9) Good indentation resistance; and
(10) Low tackiness at elevated temperature.

Prior to the present invention, the resinouns portion of the compositions commonly used consisted of blends of various commercial resins such as natural resins, ester gums, rosin maleics, rosin modified phenolics, ethyl cellulose, etc., plasticized with oils, blown castor oil or other permanent plasticizers, or in some cases, 100% solids alkyd resins have been used as the resinous portion. All of these systems suffer from certain defects. The resins based on blends change in character when heated to elevated temperatures during application because certain chemical interactions take place. In addition, many of these blends are amber in color and clean whites cannot be made from them. Another difficulty has been that the amount of plasticizer needed to obtain proper impact resistacne, to heavy trucks, for example, gives a stripe which has excessive tack and dirt collection in hot weather. Alkyd types have better color, but tackiness, even at normal temperatures, is poor. When attempts to remove this tack by over pigmentation are made, the material has poor flow characteristics.

In the present invention, the hot melt type traffic striping materials which are produced show excellent color and viscosity stability during long holds while molten, give excellent low tack properties in hot weather, and plasticization is not needed. Moreover, the resins used have particularly excellent pigment wetting and flow properties, resulting in stripes with smooth attractive surfaces. Another characteristic of these resins is a very low odor while in the form of a hot melt. Thus, the desired characteristics noted previously are achieved by the invention.

In accordance with the present invention, a solid thermoplastic resin satisfying the foregoing requirements so as to be adapted for the production of highway marking stripes by hot melt application is provided by combining large proportions of certain monoethylenically unsaturated monomer with substantial amounts of non-conjugated ethylenically unsaturated oil and with small amounts of ethylenically unsaturated aliphatic carboxylic acid or anhydride and small amounts of polyfunctional basic-acting organic compound, especially aliphatic polyhydric alcohols or oxides corresponding thereto. Selection of materials, proportions, and the use of all four components is critical to the achievement of a practical highway marking composition.

In the preferred practice of the invention, the oil component is adducted, through its ethylenic unsaturation, with from 2–10%, based on the weight of the oil, of $\alpha,\beta$-unsaturated polycarboxylic acid, and most preferably the anhydride, and the acid adduct so-formed is copolymerized with a large proportion of vinyl monomer selected from the group consisting of styrene, halogen- and $C_1$–$C_4$ alkyl-substituted styrene (especially when the substituent is in the aromatic ring), and methyl methacrylate. The acidic copolymer so-formed is then preferably coreacted with polyhydric alcohol, the ratio of hydroxyl functionality supplied by the polyhydric alcohol to carboxyl functionality supplied by the unsaturated acid being from 0.3:1 to 4:1. The proportion of vinyl monomer used in the copolymer is such as to constitute from 50–90% by weight of the total weight of the four component thermoplastic resin.

It is desired to point out that when the proportion of acid based on oil is fixed, when the ratio of polyhydric alcohol to acid is fixed, and when the proportion of vinyl monomer in the four component resin is also fixed, the proportion of all four components in the resin is determined by simple calculation, e.g., these three parameters determine the proportion of all of the components in the final resin which is produced.

Any non-conjugated drying oil, including semi-drying oils, may be used. The drying oils containing conjugated double bonds in significant proportion are known as frosting oils and these have a high tendency toward gelation and are not useful in the invention. It is preferred to employ oils which are triglycerides of unsaturated fatty acids, but unsaturated fatty acid esters of aliphatic polyols other than glycerine may be used, such as tall oil esters of pentaerythritol or trimethylol propane. Preferred oils are illustrated by safflower oil, linseed oil, perilla oil, soya oil and sunflower oil. Since the specific oil used is of secondary significance, the selection is based largely on cost and availability, and the invention will be illustrated as applied to safflower oil. The unsaturated fatty acids themselves are not useful in the invention, though small amounts may be tolerated. The use of small percentages of conjugated oils can also be tolerated, but the final product will tend to have excessively high viscosity at the elevated application temperatures of the hot melt mix without a corresponding increase in hardness at room temperature.

Any $\alpha,\beta$-monoethylenically unsaturated aliphatic carboxylic acid may be used in the invention, especially polycarboxylic acids and most preferably dicarboxylic acid anhydrides, notably maleic anhydride. Other $\alpha,\beta$-unsaturated acids and their anhydrides, when available, are illustrated by fumaric acid, crotonic acid and itaconic acid. Even monocarboxylic acids such as acrylic acid and methacrylic acid are useful, though less preferred.

As previously indicated, a small amount of acid is essential and only a small amount can be tolerated. It is convenient to relate the proportion of $\alpha,\beta$-unsaturated acid to the oil on a weight basis and from 2–10% by weight of acid is used on this basis. Preferred proportions are from 4–8% of acid based on the weight of the oil, at least 5% being preferred for anhydrides such as maleic anhydride, and not more than 6% being preferred for acids such as fumaric acid. When less than 2% of acid is used, the extensive copolymerization required by the invention is not feasible. Although more than 10% of acid may be adducted with the oil, copolymerization of the adduct with vinyl monomer to the extent required produces an undesirable gel.

The production of oil-acid adduct is well known and can be achieved by simply cooking the materials together for a time sufficient to provide a homogeneous mass, as for example, by heating the mixture of oil and acid under agitation at 425° F. for 30 minutes.

The preformed oil-acid adduct is copolymerized with vinyl monomer in large amount. The vinyl monomer is selected from the group consisting of styrene, halogen and $C_1$–$C_4$ alkyl-substituted styrene and methyl methacrylate. The preferred vinyl monomer is styrene, but vinyl toluene is also quite useful. The substituted styrenes are further illustrated by monochloro styrene, vinyl xylene, isopropyl styrene and $\alpha$-methyl styrene.

It is essential to employ a large proportion of one or more of the preferred vinyl monomers. When less than 50% of preferred vinyl monomer, based on total resin, is used, the resin is unduly soft. As a practical matter, the proportion of preferred vinyl monomer is maximized and 90% of the total resin weight is a realistic approximation of the upper limit of vinyl content.

It should be understood that other vinyl monomers may be tolerated in amounts up to 40%, based on the total weight of vinyl monomers, preferably less than 20% on said basis. Thus, acrylate and methacrylate esters such as 2-ethylhexyl acrylate and butyl methacrylate may be used. Indeed, these acrylate and methacrylate esters containing 2 or more carbon atoms in the ester radical are desirably present in small amount to provide an internal plasticizing action. Acrylonitrile is a desirable monomer in small proportion to confer improved gasoline resistance, but in yellow, rather than white-pigmented marking compositions.

For preferred practice of the invention, the weight ratio of vinyl monomer to oil is at least 65:35 and the vinyl monomer constitutes from 60–85% by weight of the final thermoplastic resin.

The fourth essential component of the resin is a small amount of a polyfunctional basic-acting organic compound, especially an aliphatic polyhydric alcohol, preferably glycerin or pentaerythritol, though other polyols such as ethylene glycol, propylene glycol, 1,4-butane diol, di-pentaerythritol and trimethylol propane may be used. The corresponding oxides, e.g., polyhydric alcohol anhydrides, such as ethylene oxide, propylene oxide, butylene oxide, styrene oxide, may also be used, especially when the acid component is not in the form of an acid anhydride.

The basic-acting organic compound, e.g., the polyhydric alcohol, in the preferred reaction, functions to cross-link the acidic copolymer and to build viscosity in this manner. The preferred proportions provide a ratio of hydroxyl groups in the polyhydric alcohol to the carboxyl groups in the carboxylic acid of from 0.5:1 to 2:1, and most preferably from 0.6:1 to 1.25:1.

While polyhydric alcohols are primarily contemplated, other polyfunctional basic-acting organic compounds such as amino-alcohols, e.g., ethanol amine, and polyfunctional amines such as ethylene diamine and methylene dianiline may be used. Of course, these are less preferred and introduce color problems. As to proportions, the amino hydrogen atom may be viewed as equivalent to the hydroxyl group.

While it is possible to take the same materials which are used in the invention and combine these in the same proportions, but using a different reaction sequence and while this has been done to successfully provide solid thermoplastic resins useful in highway marking compositions for the hot melt application of reflex reflectant highway marking strips, the results so-achieved are not fully as desirable as those obtained when the specific reaction sequence of the invention is used to produce the superior thermoplastic resins which are a prime feature of the invention.

More specifically, when the reaction sequence is changed, as indicated above, resin production is more difficult and expensive, control of molecular weight is more critical, and the resin product lacks the clarity which is achieved when the procedure of the invention is employed.

The invention is particularly directed to normally solid highway marking compositions adapted for hot melt application and which are constituted by the solid thermoplastic resins described hereinbefore which have been pigmented and filled and which preferably also include particles which will provide a reflex reflectant action in a stripe formed by the application of the composition to a pavement.

The highway marking compositions contain at least 10% by weight of titanium dioxide, preferably at least 12%, and at least 15% by weight of reflex reflectant particles, preferably at least 20% by weight. Preferably, the reflex reflectant particles are glass beads having a refractive index of at least 1.50 tested by the liquid immersion method at 25° C., the beads being desirably water white and having a size variation such that not more than 10% will pass through a No. 70 sieve and at least 95% will pass through a No. 40 sieve. While glass beads are preferred, other particulate materials of high refractive index may be used such as an appropriate sand as taught in United States Patent 2,983,202 or glass fragments as taught in United States Patent 2,865,266.

The inclusion of filler, preferably finely divided silica is also desirable.

When colors are desired, a dye such as Benzidene Yellow or Benzidene Orange may be used.

The pigmented, filled and beaded resin desirably has a softening point of at least 180° F. as measured by ASTM E28–51T which describes a specific ring and ball test apparatus and method.

The incorporation of pigment, filler, glass beads or other reflex reflectant particles, dyes, etc. into the thermoplastic resin is simply effected by melting the resin and incorporating the desired components using simple mixing or ball milling if more uniform distribution is desired. When ball milling or other dispersing technique is used, the reflex reflectant particles are mixed in as a last component.

The solid thermoplastic traffic stripe composition is applied to pavements as a hot melt which solidifies rapidly under ambient conditions permitting traffic to use the striped surface within a very short time following application. Moreover, very thick stripes may be applied, up to about ¼ inch in thickness, in a single application providing a long lasting stripe which retains its reflex reflectance quality over long periods of time and despite vehicular abrasion and exposure to the elements. Since hot melt application of normally solid thermoplastic material is a matter of common knowledge in the art, a more detailed discussion of this well known technique is not presented.

The invention is illustrated in the examples which follow:

Example 1

A solid thermoplastic resin illustrative of resins useful in highway marking compositions in the invention is prepared having the following composition:

| | Percent |
|---|---|
| Maleic anhydride | 1.7 |
| Safflower oil | 28.2 |
| Styrene | 69.5 |
| Pentaerythritol | 0.6 |
| Di-tertiary butylperoxide catalyst | |

An adduct is prepared by heating 94 parts by weight of safflower oil and 6 parts by weight of maleic anhydride in a reaction vessel under an inert atmosphere with agitation at a temperature of 425° F. for 45 minutes. The adduct so-prepared is cooled and used as follows.

1800 parts by weight of the adduct, as produced above, are copolymerized with 4200 parts by weight of styrene. The adduct is heated to 350° F. with agitation in a reaction vessel equipped with a reflux condenser, agitator, and a dropping funnel, and a mixture of the 4200 parts by weight of styrene and 42 parts by weight of di-tertiary butyl peroxide (polymerization catalyst) is added dropwise over a period of 1½ hours to 2 hours, using the condenser to reflux the styrene. When monomer addition is complete, the reaction mixture is held for ½ hour at 350° F. to insure completion of copolymerization.

The copolymer so-formed is cross-linked by reacting the copolymer with 38 parts by weight of pentaerythritol at 450° F. under a nitrogen sparge, while removing the water of esterification by using a Dean-Stark trap until the proper degree of polyesterification is obtained. Polyesterification is continued until a product is obtained which has a melting point of 165–175° F. as determined by ASTM E28–51T (ring and ball method).

The adduct of safflower oil and maleic anhydride is a homogeneous resinous mass. The copolymer of the adduct with styrene is, again, a homogeneous resinous mass, the substantially complete absence of styrene homopolymer being evident from the clarity of the product, in contrast with the product which results when corresponding proportions of styrene are copolymerized with safflower oil in the absence of maleic anhydride. The final cross-linked copolymer is clearly a unitary resinous product as is evident by its uniformity and the fact that approximately stoichiometric proportions of pentaerythritol and maleic anhydride are employed.

*Example 2*

A white highway marking composition utilizing the resin of Example 1 is prepared as follows:

|  | Parts |
|---|---|
| Resin of Example 1 | 475 |
| Titanium dioxide | 250 |
| Finely divided silica filler | 846 |
| Glass spheres (Note 1) | 429 |

The resin of Example 1 is melted and heated with intensive agitation to 350–400° F. The titanium dioxide and the silica are added as rapidly as possible while maintaining the temperature at 400° F. for good fluidity. When the mixture is homogeneously pigmented, the glass spheres are added with agitation and the mixture is drawn off into conveniently shaped pans and allowed to cool into solid blocks therein. The traffic stripe composition has the following characteristics.

| | |
|---|---|
| Melting point | 180–190° F. (ball and ring, ASTM E28–51T). |
| Impact resistance | Greater than 15 inch-pounds (ASTM D256–54T). |
| Bond strength | Greater than 150 pounds per square inch (ASTM C321–56). |

Indentation resistance (Shore durometer, ASTM D1706–59T), reading (at least):
  70 at 115° F.
  95 at 77° F.
  95 at 40° F.

| | |
|---|---|
| Resistance to yellowing of white stripe | Excellent. |
| Tackiness | None. |
| Toxic fumes on heating | None. |

Note 1.—The glass spheres which are used have a refractive index of more than 1.50 when tested by the liquid immersion method at 25° C., are free from air inclusions, consist of 75% minimum by count of water white true spheres and have the following grading:

| Sieve No.— | Percent passing |
|---|---|
| 40 | 95 maximum |
| 70 | 10 minimum |

*Example 3*

A solid thermoplastic resin is prepared, as in Example 1, with the exception that in place of 38 parts of pentaerythritol, 49 parts of dipentaerythritol are used. The resin is condensed to a higher molecular weight and, consequently, a higher viscosity and melting point, than the resin of Example 1. Repeating Example 2 with the resin of Example 3 produces the same excellent results, with the exception that the traffic stripe is somewhat harder.

*Example 4*

A superior yellow thermoplastic traffic striping material is prepared having the following composition:

|  | Parts |
|---|---|
| Resin of Example 3 | 600 |
| Benzidene Yellow | 60 |
| Benzidene Orange | 1 |
| Silica filler | 860 |
| Glass spheres (see Note 1, Example 1) | 480 |

The product is made in the same manner as in Example 2. The product is a superior yellow thermoplastic traffic striping material having essentially the same properties indicated in Example 3, except for its yellow color.

*Example 5*

A satisfactory solid thermoplastic resin adapted to be applied as a hot melt traffic stripe is prepared having the following composition:

|  | Percent |
|---|---|
| Safflower oil | 27.7 |
| Maleic anhydride | 1.7 |
| Styrene | 65.5 |
| 2-ethylhexyl acrylate | 3.4 |
| Epoxy resin (diglycidyl ether of bisphenol A in substantially pure monomeric form) | 1.7 |
| Di-tertiary butyl peroxide catalyst. | |

The oil and the acid anhydride are heated under an inert atmosphere with agitation at 425° F. for 30 minutes. The product is cooled to 350° F. and the mixture of styrene, 2-ethylhexyl acrylate and the peroxide catalyst is added over a 1½ hour period. When monomer addition is complete, the mixture is heated for an additional 30 minutes at 350° F. and the epoxy resin is added. The temperature is increased to 450° F. and is held until a viscosity of 7.0 poises at 60% non-volatile content in aromatic hydrocarbon solvent is obtained, the aromatic hydrocarbon being a commercial mixture having a distillation range of from 361–407° F. The product is drawn off at 100% non-volatile solids and has a melting point of 172° F. (ball and ring). This resin may be filled and pigmented as in Example 2 to provide a superior highway marking stripe. The presence of 2-ethylhexyl acrylate provides a desirable plasticizing effect which is particularly useful for application of highway marking compositions in cooler climates.

*Example 6*

A solid thermoplastic resin is prepared as in Example 5 with the exception that the epoxy resin is replaced with neopentyl glycol in a weight ratio of 91 glycol to 88 epoxy. The resin obtained has a melting point of 165° F. (ball and ring). This resin, when filled and pigmented, provides a superior highway marking composition adapted to be applied as a hot melt.

The invention is defined in the claims which follow.

We claim:
1. A solid thermoplastic resin adapted for hot melt ap- plication to form highway marking stripes comprising the adduct of non-conjugated ethylenically unsaturated fatty oil with from 2–10%, based on the weight of said oil, of aliphatic α,β-monoethylenically unsaturated carboxylic acid, said adduct being copolymerized with vinyl monomer, said vinyl monomer consisting essentially of monomer selected from the group consisting of styrene, halogen- and $C_1$–$C_4$ alkyl-substituted styrene and methyl methacrylate, said copolymer being cross-linked with poly-functional carboxylic acid reactive organic compound, the ratio of basic acting functionality in said organic compound to carboxyl functionality in said acid being from 0.3:1 to 4:1, and said vinyl monomer being present in an amount of from 50–90%, based on the weight of said resin.

2. The resin of claim 1 in which said vinyl monomer is styrene.

3. The resin of claim 1 in which said vinyl monomer is vinyl toluene.

4. The resin of claim 1 in which said vinyl monomer is methyl methacrylate.

5. The resin of claim 1 in which said acid is a polycarboxylic acid present in an amount of from 4–8%, based on the weight of said oil.

6. The resin of claim 5 in which said acid is maleic anhydride.

7. The resin of claim 1 in which said organic compound is selected from the group consisting of aliphatic polyhydroxy alcohols and oxides corresponding thereto.

8. A solid thermoplastic resin adapted for hot melt application to form highway marking stripes comprising the adduct of non-conjugated ethylenically unsaturated fatty oil with from 2–10%, based on the weight of said oil, of aliphatic α,β-monoethylenically unsaturated polycarboxylic acid, said adduct being copolymerized with vinyl monomer, said vinyl monomer consisting essentially of monomer selected from the group consisting of styrene, halogen- and $C_1$–$C_4$ alkyl-substituted styrene and methyl methacrylate, said copolymer being cross-linked with polyfunctional carboxylic acid reactive organic compound selected from the group consisting of aliphatic polyhydroxy alcohols and oxides corresponding thereto, the ratio of hydroxyl functionality in said organic compound to carboxyl functionality in said acid being from 0.5:1 to 2:1, and said vinyl monomer being present in an amount of from 50–90%, based on the weight of said resin.

9. The resin of claim 8 in which said acid is dicarboxylic acid anhydride and said organic compound is aliphatic polyhydroxy alcohol.

10. The resin of claim 8 in which said vinyl monomer includes a minor proportion of ester of an acid selected from the group consisting of acrylic acid and methacrylic acid with an alcohol containing at least two carbon atoms.

11. A solid thermoplastic resin adapted for hot melt application to form highway marking stripes comprising the adduct of non-conjugated ethylenically unsaturated fatty oil with from 5–8%, based on the weight of said oil, of maleic anhydride, said adduct being copolymerized with vinyl monomer, said vinyl monomer consisting essentially of monomer selected from the group consisting of styrene, halogen- and $C_1$–$C_4$ alkyl-substituted styrene and methyl methacrylate, said copolymer being cross-linked with aliphatic polyhydroxy alcohol, the ratio of hydroxyl functionality in said alcohol to carboxyl functionality in said acid being from 0.5:1 to 2:1, and said vinyl monomer being present in an amount of from 60–85%, based on the weight of said resin.

12. The resin of claim 11 in which said vinyl monomer is styrene.

13. The resin of claim 11 in which said alcohol is glycerin.

14. The resin of claim 11 in which said alcohol is pentaerythritol.

15. The resin of claim 11 in which said oil is safflower oil.

16. The resin of claim 11 in which said ratio of hydroxyl functionality to carboxyl functionality is from 0.6:1 to 1.25:1.

17. A process for producing solid thermoplastic resin adapted for hot melt application to form highway marking stripes comprising heat-reacting non-conjugated ethylenically unsaturated fatty oil with from 2–10%, based on the weight of said oil, of aliphatic α,β-monoethylenically unsaturated carboxylic acid to form an adduct, copolymerizing said adduct with a large proportion of vinyl monomer, said vinyl monomer consisting essentially of monomer selected from the group consisting of styrene, halogen- and $C_1$–$C_4$ alkyl-substituted styrene and methyl methacrylate to form a copolymer, and cross-linking said copolymer at elevated temperature in the form of a hot melt with polyfunctional carboxylic acid reactive organic compound to increase the viscosity thereof, the ratio of basic-acting functionality in said organic compound to carboxyl functionality in said acid being from 0.3:1 to 4:1, and said vinyl monomer being employed in an amount of from 50–90%, based on the weight of said resin.

18. A highway marking composition adapted for hot melt application to form highway marking stripes comprising solid thermoplastic resin having dispersed therein pigment and reflex-reflectant particles, said solid resin comprising the adduct of non-conjugated ethylenically unsaturated fatty oil with from 2–10%, based on the weight of said oil, of aliphatic α,β-monoethylenically unsaturated carboxylic acid, said adduct being copolymerized with vinyl monomer, said vinyl monomer consisting essentially of monomer selected from the group consisting of styrene, halogen- and $C_1$–$C_4$ alkyl-substituted styrene and methyl methacrylate, said copolymer being cross-linked with polyfunctional carboxylic acid reactive organic compound, the ratio of basic-acting functionality in said organic compound to carboxyl functionality in said acid being from 0.3:1 to 4:1, and said vinyl monomer being present in an amount of from 50–90%, based on the weight of said resin.

19. A highway marking composition adapted for hot melt application to form highway marking stripes comprising solid thermoplastic resin having dispersed therein at least 10% by weight of the composition of titanium dioxide and at least 20% by weight of the composition of particles of high refractive index providing stripes formed of said composition with reflex reflectance quality, said solid resin comprising the adduct of non-conjugated ethylenically unsaturated fatty oil with from 2–10%, based on the weight of said oil, of aliphatic α,β-monoethylenically unsaturated polycarboxylic acid, said adduct being copolymerized with vinyl monomer, said vinyl monomer consisting essentially of monomer selected from the group consisting of styrene, halogen- and $C_1$–$C_4$ alkyl-substituted styrene and methyl methacrylate, said copolymer being cross-linked with polyfunctional carboxylic acid reactive organic compound selected from the group consisting of aliphatic polyhydroxy alcohols and oxides corresponding thereto, the ratio of basic-acting hydroxyl functionality in said organic compound to carboxyl functionality in said acid being from 0.5:1 to 2:1, and said vinyl monomer being present in an amount of from 50–90%, based on the weight of said resin.

20. The highway marking composition of claim 19 in which said composition contains finely divided silica as filler.

21. The highway marking composition of claim 19 in which said particles of high refractive index are glass beads.

(References on following page)

References Cited by the Examiner

UNITED STATES PATENTS

| | | | |
|---|---|---|---|
| 2,542,808 | 2/1951 | Gilman et al. | 260—23 |
| 2,549,309 | 4/1951 | Hill et al. | 260—23 |
| 3,005,790 | 10/1961 | Wynn et al. | 94—1.5 |
| 3,030,870 | 4/1962 | Gill | 94—1.5 |
| 3,036,928 | 5/1962 | Poole | 94—1.5 |
| 3,046,851 | 7/1962 | De Vries | 94—1.5 |
| 3,136,736 | 6/1964 | Washburne et al. | 260—837 |

FOREIGN PATENTS

| | | |
|---|---|---|
| 723,115 | 2/1955 | Great Britain. |

LEON J. BERCOVITZ, *Primary Examiner.*

R. A. WHITE, *Assistant Examiner.*